United States Patent
Gururaj et al.

(10) Patent No.: US 12,461,853 B2
(45) Date of Patent: Nov. 4, 2025

(54) DATA STORAGE DEVICE WITH KEY-VALUE DELETE MANAGEMENT FOR MULTI-HOST NAMESPACES

(71) Applicant: Western Digital Technologies, Inc., San Jose, CA (US)

(72) Inventors: Pavan Gururaj, Bangalore (IN); Dinesh Babu, Bangalore (IN); Sridhar Sabesan, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/365,033

(22) Filed: Aug. 3, 2023

(65) Prior Publication Data
US 2025/0004940 A1 Jan. 2, 2025

Related U.S. Application Data

(60) Provisional application No. 63/510,412, filed on Jun. 27, 2023.

(51) Int. Cl.
*G06F 12/02* (2006.01)
*G06F 12/0891* (2016.01)

(52) U.S. Cl.
CPC ...... *G06F 12/0253* (2013.01); *G06F 12/0891* (2013.01)

(58) Field of Classification Search
None
See application file for complete search history.

(56) References Cited

U.S. PATENT DOCUMENTS

| | | | |
|---|---|---|---|
| 8,484,242 B1 * | 7/2013 | Singh ................. | G06F 16/2453 707/770 |
| 9,558,112 B1 * | 1/2017 | Borchers ............ | G06F 12/0253 |
| 9,772,787 B2 * | 9/2017 | Oikarinen ........... | G06F 3/064 |
| 9,785,356 B2 | 10/2017 | Huang | |
| 9,971,526 B1 * | 5/2018 | Wei .................... | G06F 3/064 |
| 10,768,820 B2 * | 9/2020 | Subramanian ....... | G06F 12/109 |
| 11,734,429 B1 | 8/2023 | Shanmugam | |
| 2007/0292563 A1 | 12/2007 | Kappelman | |
| 2009/0070560 A1 * | 3/2009 | Meng ................. | G06F 9/52 712/216 |
| 2018/0088811 A1 | 3/2018 | Kanno | |
| 2018/0121344 A1 | 5/2018 | Seo | |
| 2018/0364917 A1 * | 12/2018 | Ki ..................... | G06F 3/068 |
| 2019/0129862 A1 | 5/2019 | Yoshida | |
| 2019/0180546 A1 * | 6/2019 | Tsujimura .......... | G07C 9/00896 |
| 2019/0303610 A1 * | 10/2019 | Bodegas Martinez | G06F 16/152 |
| 2020/0065198 A1 * | 2/2020 | Reed ................. | G06F 11/1469 |
| 2021/0126909 A1 * | 4/2021 | Iyer .................. | H04L 63/06 |
| 2021/0349849 A1 * | 11/2021 | Haberkorn ......... | G06F 16/273 |
| 2022/0237309 A1 * | 7/2022 | Reineke ............ | G06F 21/6245 |
| 2023/0026780 A1 * | 1/2023 | Yuan ................ | G06F 16/75 |

(Continued)

*Primary Examiner* — Jared I Rutz
*Assistant Examiner* — Elias Young Kim
(74) *Attorney, Agent, or Firm* — Patent Law Works LLP

(57) ABSTRACT

Systems, methods, and data storage devices for management of key-value delete operations for namespaces supporting multiple hosts are described. Responsive to a delete command, the key for the deleted key-value pair may be moved to a deleted data structure having a delete order. During garbage collection erase blocks corresponding to the key-value pairs may be invalidated based on the delete order and removed from the deleted data structure.

20 Claims, 8 Drawing Sheets

(56) References Cited

U.S. PATENT DOCUMENTS

2024/0020267 A1  1/2024  Liu
2024/0191891 A1  6/2024  Abizeid

* cited by examiner

DATA STORAGE DEVICE WITH KEY-VALUE DELETE MANAGEMENT FOR MULTI-HOST NAMESPACES

TECHNICAL FIELD

The present disclosure generally relates to storage systems supporting a plurality of hosts and, more particularly, to data storage devices managing delete requests for key values in the same namespace from multiple hosts.

BACKGROUND

Multi-device storage systems utilize multiple discrete data storage devices, generally disk drives (solid-state drives (SSD), hard disk drives (HDD), hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

There is an emerging trend in the storage industry to deploy disaggregated storage. Disaggregated storage brings significant cost savings via decoupling compute and storage node life cycles and allowing different nodes or subsystems to have different compute to storage ratios. In addition, disaggregated storage allows significant flexibility in migrating compute jobs from one physical server to another for availability and load balancing purposes.

Disaggregated storage has been implemented using a number of system architectures, including the passive Just-a-Bunch-of-Disks (JBOD) architecture, the traditional All-Flash Architecture (AFA), and Ethernet Attached Bunch of Flash (EBOF) disaggregated storage, which typically uses specialized chips to translate commands from external NVMe-OF (Non-Volatile Memory Express over Fabrics) protocol to internal NVMe (NVM Express) protocol. These architectures may be configured to support various Quality of Service (QOS) metrics and requirements to support host applications, often supporting a plurality of host systems with different workload requirements.

The systems may be deployed in data centers to support cloud computing services, such as platform as a service (PaaS), infrastructure as a service (IaaS), and/or software as a service (SaaS). Data centers and their operators may offer defined (and sometime contractually guaranteed) QoS with responsive, on-demand provisioning of both hardware and software resources in multi-tenant systems. In some configurations, multiple hosts may have access to the same namespaces in one or more data storage devices and the ability to delete data written by other hosts. For example, when multiple hosts support the same application, it may make sense for them all to be configured with read/write access to the same namespace. Unfortunately, this access may also lead to conflicts and/or accidental deletions by one host of data that is still needed by another host.

Some data storage devices are configured to support key-value storage as a native device function. A variable length key may be used to index variable length values stored in the physical storage of the storage device as unstructured data allocated in increments of bytes. For example, keys may be variable length values from 1 to 32 bytes and unique across the data storage device (and may be unique across multiple devices and multiple namespaces). Value sizes may start at 1 byte but may include unstructured data of megabytes or more (some standards allow up to 4 gigabytes). The data storage device may not maintain any metadata for the value and may not allow update or extensions of the value—it is a complete value when stored. The flash translation layer (FTL) of the data storage device may directly map keys to physical storage locations for the corresponding value. Deletion may remove the key-value pair and render the physical space used available for garbage collection. The data storage device may be configured to list all active keys stored on the device to a host or administrator, but deleted key-values may not appear in that list.

Therefore, there still exists a need for storage systems and data storage devices configured to manage deletion of data in a namespace shared among multiple hosts.

SUMMARY

Various aspects for data storage device management of key-value delete operations for namespaces supporting multiple hosts are described. More particularly, the data storage device may append a host identifier to each value and manage a delete list identifying foreign host deletions.

One general aspect includes a data storage device that includes a non-volatile storage medium, a host interface configured to receive host storage commands from a plurality of host systems, and a controller configured to: store, to the non-volatile storage medium, host data units as values indexed by a corresponding key in key-value pairs; receive, from a first host system of the plurality of host systems, a delete command for a target key-value pair; move, responsive to the delete command, the corresponding key for the target key-value pair to a deleted data structure having a delete order; invalidate, during garbage collection, erase blocks corresponding to key-value pairs from the deleted data structure based on the delete order; and remove, responsive to garbage collection, corresponding keys for the invalidated key-value pairs from the deleted data structure.

Implementations may include one or more of the following features. The controller may be further configured to: receive, from a second host system of the plurality of host systems, a retrieve command for the target key-value pair after the delete command; determine, responsive to the retrieve command, that the target key-value pair is not an active key-value pair; determine, responsive to determining that the target key-value pair is not an active key-value pair, whether the corresponding key for the target key-value pair is in the deleted data structure; and return, responsive to the corresponding key for the target key-value pair being in the deleted data structure, the key-value pair to the second host system. The controller may be further configured to: add, responsive to the retrieve command for the target key-value pair determined to be in the deleted data structure, the corresponding key for the target key-value pair to an active key-value pair data structure; and remove, responsive to the retrieve command for the target key-value pair determined to be in the deleted data structure, the corresponding key for the target key-value pair from the deleted data structure. The controller may be further configured to, responsive to the corresponding key for the target key-value pair not being in the deleted data structure, return a key not found notification to the second host system. The controller may be further configured to: receive, prior to receiving the delete command, a store command for the target key-value pair including the corresponding key and host data unit for the target key-value pair; determine a first host identifier for a storing host system; and associate the first host identifier with the host data unit for the target key-value pair. Associating the first host identifier with the host data unit for the target key-value pair may include: appending the first host identifier to the host data unit to determine the value for the target key-value pair; and storing the value for the target key-value pair to the non-volatile storage medium. The controller may be further configured to, responsive to receiving the delete command: determine the first host identifier from the stored value for the target key-value pair; determine a second host identifier for the first host system; and add, based on comparing the first host identifier to the second host identifier, a foreign host indicator to an entry in the deleted data structure for the target key-value pair. The foreign host indicator may be selected from: a first indicator value corresponding to the first host identifier matching the second host identifier; and a second indicator value corresponding to the first host identifier being different than the second host identifier. The controller may be further configured to: determine the delete order for the deleted data structure; and select, during garbage collection, a next key-value pair from the deleted data structure to invalidate corresponding erase blocks. The delete order may be based on at least one priority parameter selected from: entry order into the deleted data structure; a memory size of the value for the next key-value pair; an error rate of an erase block corresponding to the value for the next key-value pair; and a foreign host indicator. The controller may be further configured to: determine a deletion condition for the target key-value pair; and send, based on the deletion condition, a notification message to at least one host system of the plurality of host systems.

Another general aspect includes a computer-implemented method that includes: storing, to a non-volatile storage medium of a data storage device, host data units as values indexed by a corresponding key in key-value pairs; receiving, by the data storage device and from a first host system of a plurality of host systems, a delete command for a target key-value pair; moving, by the data storage device and responsive to the delete command, the corresponding key for the target key-value pair to a deleted data structure having a delete order; invalidating, by the data storage device and during garbage collection, erase blocks corresponding to key-value pairs from the deleted data structure based on the delete order; and removing, by the data storage device and responsive to garbage collection, corresponding keys for invalidated key-value pairs from the deleted data structure.

Implementations may include one or more of the following features. The computer-implemented method may include: receiving, from a second host system of the plurality of host systems, a retrieve command for the target key-value pair after the delete command; determining, responsive to the retrieve command, that the target key-value pair is not an active key-value pair; determining, responsive to determining that the target key-value pair is not an active key-value pair, whether the corresponding key for the target key-value pair is in the deleted data structure; and returning, responsive to the corresponding key for the target key-value pair being in the deleted data structure, the key-value pair to the second host system. The computer-implemented method may include: adding, responsive to the retrieve command for the target key-value pair determined to be in the deleted data structure, the corresponding key for the target key-value pair to an active key-value pair data structure; and removing, responsive to the retrieve command for the target key-value pair determined to be in the deleted data structure, the corresponding key for the target key-value pair from the deleted data structure. The computer-implemented method may include returning, responsive to the corresponding key for the target key-value pair not being in the deleted data structure, a key not found notification to the second host system. The computer-implemented method may include: receiving, prior to receiving the delete command, a store command for the target key-value pair including the corresponding key and host data unit for the target key-value pair; determining a first host identifier for a storing host system; and associating the first host identifier with the host data unit for the target key-value pair. Associating the first host identifier with the host data unit for the target key-value pair may include: appending the first host identifier to the host data unit to determine the value for the target key-value pair; and storing the value for the target key-value pair to the non-volatile storage medium. The computer-implemented method may include: determining the first host identifier from the stored value for the target key-value pair; determining a second host identifier for the first host system; and adding, based on comparing the first host identifier to the second host identifier, a foreign host indicator to an entry in the deleted data structure for the target key-value pair. The foreign host indicator may be selected from: a first indicator value corresponding to the first host identifier matching the second host identifier; and a second indicator value corresponding to the first host identifier being different than the second host identifier. The computer-implemented method may include: determining the delete order for the deleted data structure; and selecting, during garbage collection, a next key-value pair from the deleted data structure to invalidate corresponding erase blocks. The delete order may be based on at least one priority parameter selected from: entry order into the deleted data structure; a memory size of the value for the next key-value pair; an error rate of an erase block corresponding to the value for the next key-value pair; and a foreign host indicator. The computer-implemented method may include: determining a deletion condition for the target key-value pair; and sending, based on the deletion condition, a notification message to at least one host system of the plurality of host systems.

Another general aspect includes a data storage device that includes: a processor; a memory; a non-volatile storage medium; a host interface configured to receive host storage commands from a plurality of host systems; means for storing, to the non-volatile storage medium, host data units as values indexed by a corresponding key in key-value pairs; means for receiving, from a first host system of the plurality of host systems, a delete command for a target key-value pair; means for moving, responsive to the delete command, the corresponding key for the target key-value pair to a deleted data structure having a delete order; means for invalidating, during garbage collection, erase blocks corresponding to key-value pairs from the deleted data structure based on the delete order; and means for removing, responsive to garbage collection, corresponding keys for the invalidated key-value pairs from the deleted data structure.

The various embodiments advantageously apply the teachings of data storage devices and/or multi-device storage systems to improve the functionality of such computer systems. The various embodiments include operations to overcome or at least reduce the issues previously encountered in storage arrays and/or systems and, accordingly, are more reliable and/or efficient than other computing systems. That is, the various embodiments disclosed herein include hardware and/or software with functionality to improve shared access to non-volatile memory resources by host systems in multi-tenant storage systems, such as by enabling key-value data storage devices to track and manage deletions by foreign hosts. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
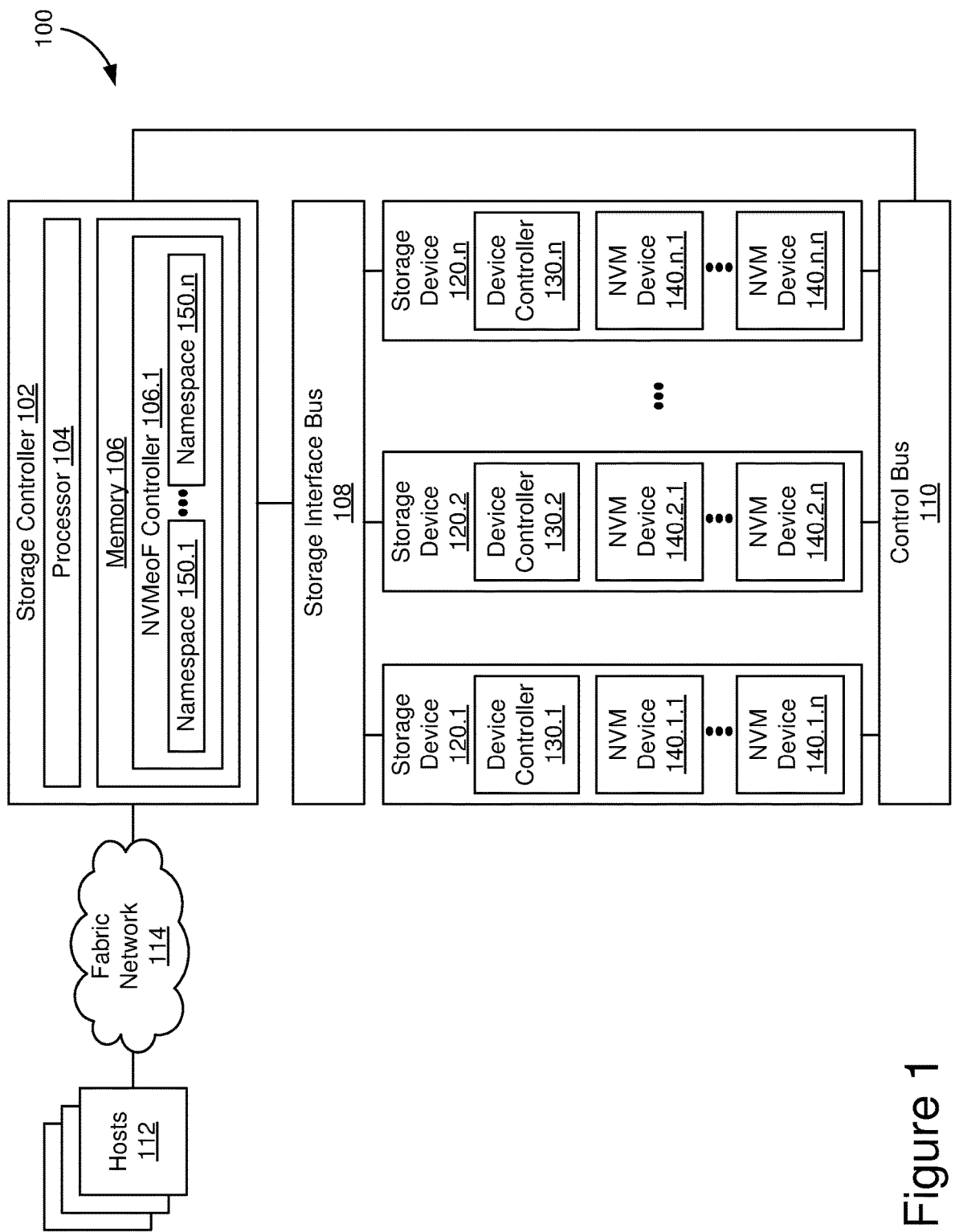
FIG. 1 schematically illustrates a multi-device storage system supporting a plurality of host systems.

FIG. 1 shows an embodiment of an example data storage system 100 with multiple data storage devices 120 supporting a plurality of host systems 112 through storage controller 102. While some example features are illustrated, various other features have not been illustrated for the sake of brevity and so as not to obscure pertinent aspects of the example embodiments disclosed herein. To that end, as a non-limiting example, data storage system 100 may include one or more data storage devices 120 (also sometimes called information storage devices, storage devices, disk drives, or drives) configured in a storage node with storage controller 102. In some embodiments, storage devices 120 may be configured in a server, storage array blade, all flash array appliance, or similar storage unit for use in data center storage racks or chassis. Storage devices 120 may interface with one or more host nodes or host systems 112 and provide data storage and retrieval capabilities for or through those host systems. In some embodiments, storage devices 120 may be configured in a storage hierarchy that includes storage nodes, storage controllers (such as storage controller 102), and/or other intermediate components between storage devices 120 and host systems 112. For example, each storage controller 102 may be responsible for a corresponding set of storage devices 120 in a storage node and their respective storage devices may be connected through a corresponding backplane network or internal bus architecture including storage interface bus 108 and/or control bus 110, though only one instance of storage controller 102 and corresponding storage node components are shown. In some embodiments, storage controller 102 may include or be configured within a host bus adapter for connecting storage devices 120 to fabric network 114 for communication with host systems 112.

In the embodiment shown, a number of storage devices 120 are attached to a common storage interface bus 108 for host communication through storage controller 102. For example, storage devices 120 may include a number of drives arranged in a storage array, such as storage devices sharing a common rack, unit, or blade in a data center or the SSDs in an all flash array. In some embodiments, storage devices 120 may share a backplane network, network switch(es), and/or other hardware and software components accessed through storage interface bus 108 and/or control bus 110. For example, storage devices 120 may connect to storage interface bus 108 and/or control bus 110 through a plurality of physical port connections that define physical, transport, and other logical channels for establishing communication with the different components and subcomponents for establishing a communication channel to host 112. In some embodiments, storage interface bus 108 may provide the primary host interface for storage device management and host data transfer, and control bus 110 may include limited connectivity to the host for low-level control functions.

In some embodiments, storage devices 120 may be referred to as a peer group or peer storage devices because they are interconnected through storage interface bus 108 and/or control bus 110. In some embodiments, storage devices 120 may be configured for peer communication among storage devices 120 through storage interface bus 108, with or without the assistance of storage controller 102 and/or host systems 112. For example, storage devices 120 may be configured for direct memory access using one or more protocols, such as non-volatile memory express (NVMe), remote direct memory access (RDMA), NVMe over fabric (NVMeOF), etc., to provide command messaging and data transfer between storage devices using the high-bandwidth storage interface and storage interface bus 108.

In some embodiments, data storage devices 120 are, or include, solid-state drives (SSDs). Each data storage device 120.1-120.n may include a non-volatile memory (NVM) or device controller 130 based on compute resources (processor and memory) and a plurality of NVM or media devices 140 to provide a non-volatile storage medium for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with storage interface bus 108 and/or control bus 110.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 may include one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes a device controller 130, which includes one or more processing units (also sometimes called central processing units (CPUs), processors, microprocessors, or microcontrollers) configured to execute instructions in one or more programs. In some embodiments, the one or more processors are shared by one or more components within, and in some cases, beyond the function of the device controllers. In some embodiments, device controllers 130 may include firmware for controlling data written to and read from media devices 140, one or more storage (or host) interface protocols for communication with other components, as well as various internal functions, such as garbage collection, wear leveling, media scans, and other memory and data maintenance. For example, device controllers 130 may include firmware for running the NVM layer of an NVMe storage protocol alongside media device interface and management functions specific to the storage device. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. In some configurations, the data unit may be the value portion of a key-value pair, where hosts 112 may define a key and provide a corresponding data unit of unstructured data (from a storage device perspective) having a memory size selected by the host. Storage devices 120 may store the key as a unique index value and map storage locations meeting the memory size in NVM devices 140 for storing the data unit. Storage locations may include physical and/or logical locations on storage devices 120 and may be described and/or allocated at different levels of granularity depending on the storage medium, storage device/system configuration, and/or context. For example, the storage device may manage the variable sizes of key-value pairs by allocating appropriately sized storage locations mapped to the particular key for addressability for host read/write purposes but managed as pages within storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks.

In some embodiments, storage controller 102 may be coupled to data storage devices 120 through a network interface that is part of host fabric network 114 and includes storage interface bus 108 as a host fabric interface. In some embodiments, host systems 112 are coupled to data storage system 100 through fabric network 114 and storage controller 102 may include a storage network interface, host bus adapter, or other interface capable of supporting communications with multiple host systems 112. Fabric network 114 may include a wired and/or wireless network (e.g., public and/or private computer networks in any number and/or configuration) which may be coupled in a suitable way for transferring data. For example, the fabric network may include any means of a conventional data communication network such as a local area network (LAN), a wide area network (WAN), a telephone network, such as the public switched telephone network (PSTN), an intranet, the internet, or any other suitable communication network or combination of communication networks. From the perspective of storage devices 120, storage interface bus 108 may be referred to as a host interface bus and provides a host data path between storage devices 120 and host systems 112, through storage controller 102 and/or an alternative interface to fabric network 114.

Host systems 112, or a respective host in a system having multiple hosts, may be any suitable computer device, such as a computer, a computer server, a laptop computer, a tablet device, a netbook, an internet kiosk, a personal digital assistant, a mobile phone, a smart phone, a gaming device, or any other computing device. Host systems 112 are sometimes called a host, client, or client system. In some embodiments, host systems 112 are server systems, such as a server system in a data center. In some embodiments, the one or more host systems 112 are one or more host devices distinct from a storage node housing the plurality of storage devices 120 and/or storage controller 102. In some embodiments, host systems 112 may include a plurality of host systems owned, operated, and/or hosting applications belonging to a plurality of entities and supporting one or more quality of service (QOS) standards for those entities and their applications. Host systems 112 may be configured to store and access data in the plurality of storage devices 120 in a multi-tenant configuration with shared storage resource pools, such as host connections to namespaces defined in storage devices 120.

Storage controller 102 may include one or more central processing units (CPUs) or processors 104 for executing compute operations, storage management operations, and/or instructions for accessing storage devices 120 through storage interface bus 108. In some embodiments, processors 104 may include a plurality of processor cores which may be assigned or allocated to parallel processing tasks and/or processing threads for different storage operations and/or host storage connections. In some embodiments, processor 104 may be configured to execute fabric interface for communications through fabric network 114 and/or storage interface protocols for communication through storage interface bus 108 and/or control bus 110. In some embodiments, a separate network interface unit and/or storage interface unit (not shown) may provide the network interface protocol and/or storage interface protocol and related processor and memory resources.

Storage controller 102 may include a memory 106 configured to support a storage interface controller, such as NVMeoF controller 106.1 that controls communication between hosts 112 and storage devices 120 in accordance with a corresponding storage interface protocol. For example, NVMeoF controller 106.1 may support a plurality of namespaces 150 allocated in storage devices 120 and manage access from hosts 112 through host connections to command queues allocated in storage devices 120. NVMeoF controller 106.1 may provide an interface for hosts 112 to access the shared storage resources of storage devices 120. In some configurations, multiple hosts from hosts 112 may have connections to the same namespace 150.1 or 150.n in one or more of storage devices 120. These hosts may share keys and support common applications supported by a shared namespace, enabling multiple hosts to issue store, retrieve, delete, and other commands targeting the same key-value pair. In some embodiments, memory 106 may include one or more dynamic random access memory (DRAM) devices for use by storage devices 120 for command, management parameter, and/or host data storage and transfer to support namespaces 150. In some embodiments, storage devices 120 may be configured for direct memory access (DMA), such as using remote direct memory access (RDMA) protocols, over storage interface bus 108.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2A:
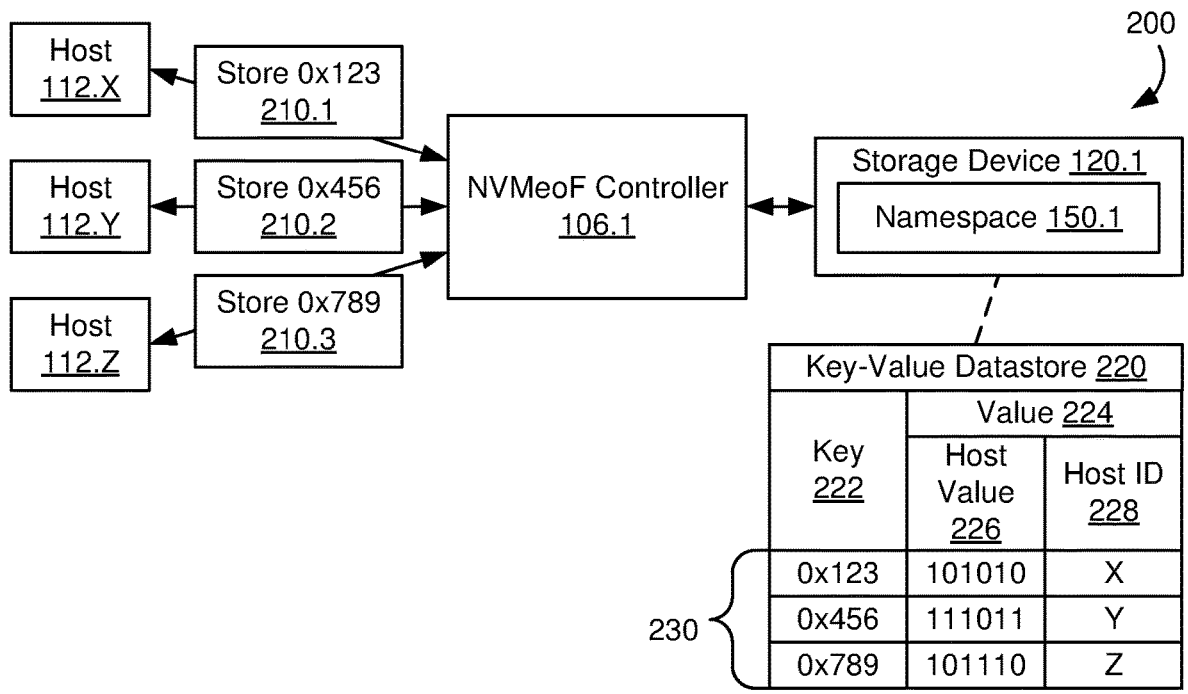
FIG. 2 schematically illustrates an example storage system for managing delete commands from multiple hosts.
Figure 2B:
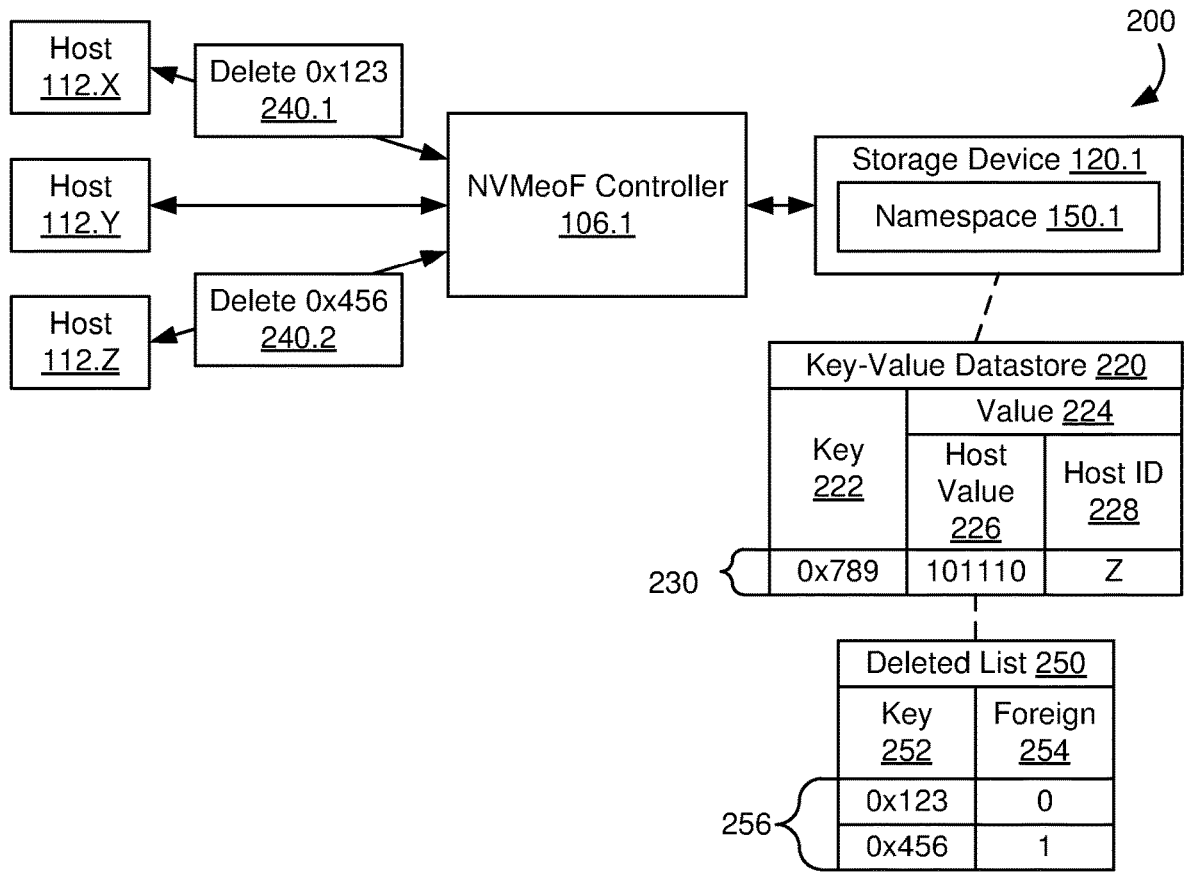

FIGS. 2a and 2b show schematic representations of an example storage system 200, such as an all flash array or just-a-bunch-of-flash (JBOF) enclosure using NVMeoF interface protocols to support hosts 112.X, 112.Y, 112.Z shared access to namespace 150.1 in storage device 120.1. In some configurations, storage system 200 may be configured similarly to multi-device storage system 100 in FIG. 1. In FIG. 2a, hosts 112 each issue a store command 210 with corresponding key identifiers to namespace 150.1 in storage device 120.1 through NVMeoF controller 106.1. For example, host 112.X may send store command 210.1 for key 0×123 and a corresponding host data unit, host 112.Y may send store command 210.2 for key 0×456 and a corresponding host data unit, and host 112.Z may send store command 210.3 for key 0×789 and a corresponding host data unit.

As drive 120.1 receives each store command 210 it may add the key to a key-value datastore 220 comprised of key-value pairs mapped through the FTL layer of drive 120.1. For example, key-value datastore 220 may include mapping entries for keys 222 in an FTL data structure that maintains an active key-value pair list comprised of the received key identifiers from store commands 210. Key-value datastore 220 may include values 224 corresponding to each key 222, where corresponding values 224 are written to physical storage locations in the NVM of drive 120.1 and managed as a key-value data unit with key-to-value storage location mapping in the FTL layer. In the configuration shown, drive 120.1 may append a host identifier 228 to the host data unit value 226 received in store commands 210 to determine values 224. For example, drive 120.1 may be configured with host identifier values associated with each host connection to namespace 150.1 and/or each store command 210 may include a host identifier parameter and a corresponding host identifier 228 may be determined prior to storing value 224 to the NVM. In some configurations, host identifiers 228 may correspond to one or more bytes of a host identifier value appended to the end of host data unit value 226 and stored in a unitary write command for value 224 to the NVM. Appending host identifier 228 to host data unit value 226 may be compatible with not maintaining metadata tables for active key-value pairs and storage device 120 may use the known location of host identifier 228 in each value 224 to read, parse, and/or remove host identifier 228. For example, when the key-value pair is subsequently read for a host retrieve command, the host identifier may be removed from value 224 to return only host data unit value 226 to the requesting host.

In FIG. 2b, two delete commands 240 may be received from hosts 112. Similar to store commands 210, delete commands 240 may be directed though NVMeoF controller 106.1 to namespace 150.1 in drive 120.1 and include the corresponding key for the targeted key-value pair as a command parameter. In the configuration shown, rather than simply removing key 222 from the active key list and invalidating the corresponding erase blocks for the physical storage locations of corresponding value 224, key 222 may be moved to a deleted list 250 or similar data structure in drive 120.1. For example, host 112.X may send delete command 240.1 targeting the key-value pair with key 0×123 and host 112.Z may send delete command 240.2 targeting the key-value pair with key 0×456. As a result, corresponding key entries 230 for 0×123 and 0×456 may be removed from the active key-value pair list and effectively removed from key-value datastore 220, while being added as deleted list entries 256 in deleted list 250. Keys 252 may remain in deleted list 250 until they are removed by garbage collection and may enable recovery of deleted key-value pairs until they are invalidated through garbage collection. As further described below, deleted list 250 may be used to determine a delete order for invalidation by garbage collection to preserve deleted key-value pairs until their storage locations are needed.

In the configuration shown, deleted list 250 may include a foreign host indicator 254 configured to indicate whether a key-value has been deleted by the host that originally stored it or by another host, referred to as a foreign host. For example, drive 120.1 may compare the host identifier from the delete command with the host identifier 228 stored in value 224 for the target key-value pair to determine whether or not the host identifiers match. If the host identifiers match, the original or native host is deleting a key-value pair that it originally stored. If the host identifiers do not match, a foreign host is deleting the key-value pair originally stored by another host. These foreign host deletions may be allowed by the namespace configuration for namespace 150.1. For example, the namespace may not be reserved or limit access by the multiple hosts, such as when they are supporting parallel instances of an application. In the example shown, foreign host indicator 245 may be a flag value added to key entries 256 in deleted list 250, such as a single bit where a 0 value indicates the original host and 1 indicates a foreign host. Therefore, key 0×123 may receive a 0 because host 112.X issued both store command 210.1 and delete command 240.1 targeting key 0×123 and key 0×456 may receive a 1 because host 112.Y issued store command 210.2 and host 112.Z issued delete command 0×456. Uses of delete list 250 may be further described below.

Figure 3:
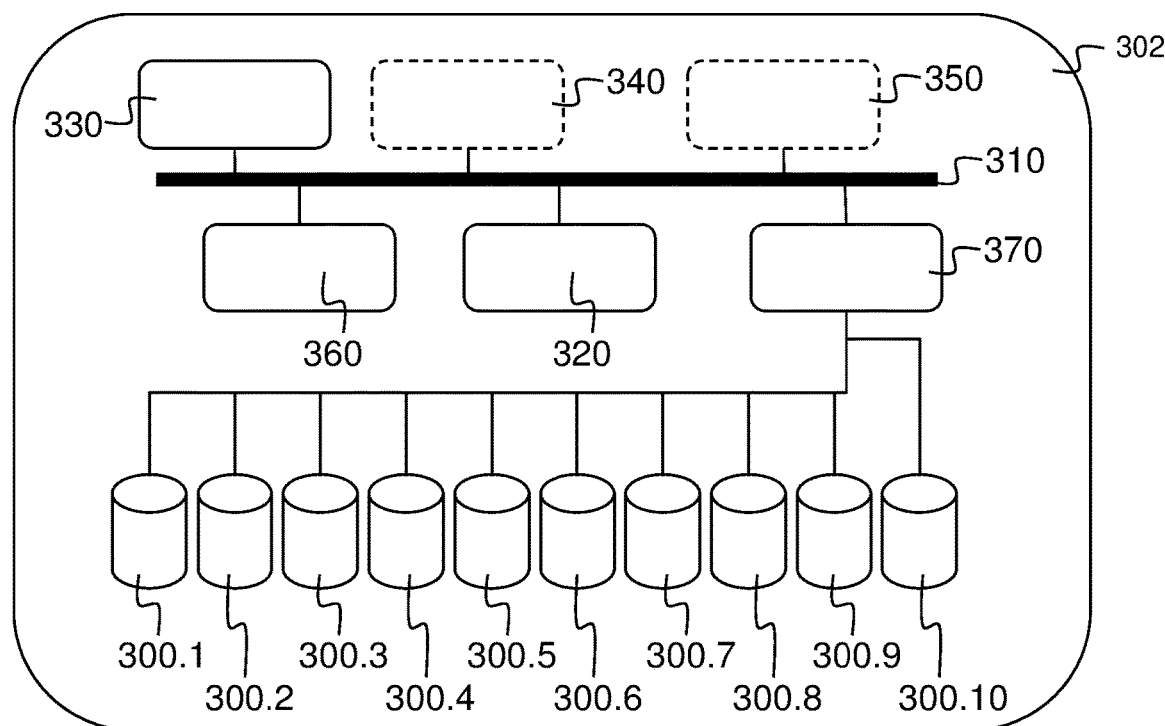
FIG. 3 schematically illustrates a storage node of the multi-device storage system of FIG. 1.

FIG. 3 shows a schematic representation of a storage node 302. For example, storage controller 102 may be configured as a storage node 302 for accessing storage devices 120 as storage elements 300. Storage node 302 may comprise a bus 310, a storage node processor 320, a storage node memory 330, one or more optional input units 340, one or more optional output units 350, a communication interface 360, a storage element interface 370 and a plurality of storage elements 300.1-300.10. In some embodiments, at least portions of bus 310, processor 320, local memory 330, communication interface 360, storage element interface 370 may comprise a storage controller, backplane management controller, network interface controller, or host bus interface controller, such as storage controller 102. Bus 310 may include one or more conductors that permit communication among the components of storage node 302. Processor 320 may include any type of conventional processor or microprocessor that interprets and executes instructions. Local memory 330 may include a random-access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 302, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 302 to communicate with other devices and/or systems, for example mechanisms for communicating with other storage nodes 302 or host systems 112. Storage element interface 370 may comprise a storage interface, such as a Serial Advanced Technology Attachment (SATA) interface, a Small Computer System Interface (SCSI), peripheral computer interface express (PCIe), etc., for connecting bus 310 to one or more storage elements 300, such as one or more storage devices 120, for example, 2 terabyte (TB) NVMe solid state drives (SSDs), and control the reading and writing of data to/from these storage elements 300. As shown in FIG. 3, such a storage node 302 could comprise ten 2 TB NVMe disk drives as storage elements 300.1-300.10 and, in this way, storage node 302 would provide a storage capacity of 20 TB to the storage system 100.

Storage elements 300 may be configured as redundant or operate independently of one another. In some configurations, if one particular storage element 300 fails its function can easily be taken on by another storage element 300 in the storage system. Furthermore, the independent operation of the storage elements 300 allows to use any suitable mix of types storage elements 300 to be used in a particular storage system 100. It is possible to use for example storage elements with differing storage capacity, storage elements of differing manufacturers, using different hardware technology such as for example conventional hard disks and solid-state storage elements, using different storage interfaces, and so on. All this results in specific advantages for scalability and flexibility of storage system 100 as it allows to add or remove storage elements 300 without imposing specific requirements to their design in correlation to other storage elements 300 already in use in that storage system 100.

Figure 4:
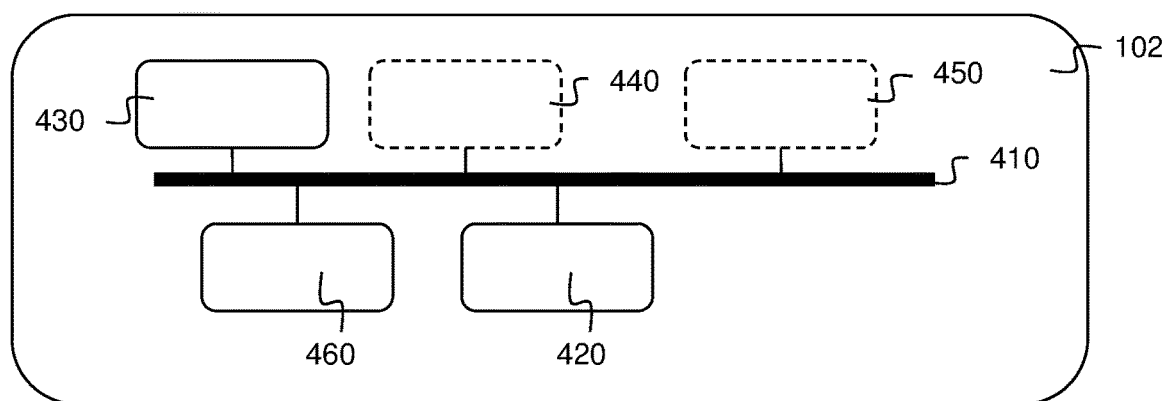
FIG. 4 schematically illustrates a host node of the multi-device storage system of FIG. 1.

FIG. 4 shows a schematic representation of an example host system 112. Host system 112 may comprise a bus 410, a processor 420, a local memory 430, one or more optional input units 440, one or more optional output units 450, and a communication interface 460. Bus 410 may include one or more conductors that permit communication among the components of host 112. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. An optional input unit 440 may include one or more conventional mechanisms that permit an operator to input information to host 112 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables host 112 to communicate with other devices and/or systems.

Figure 5:
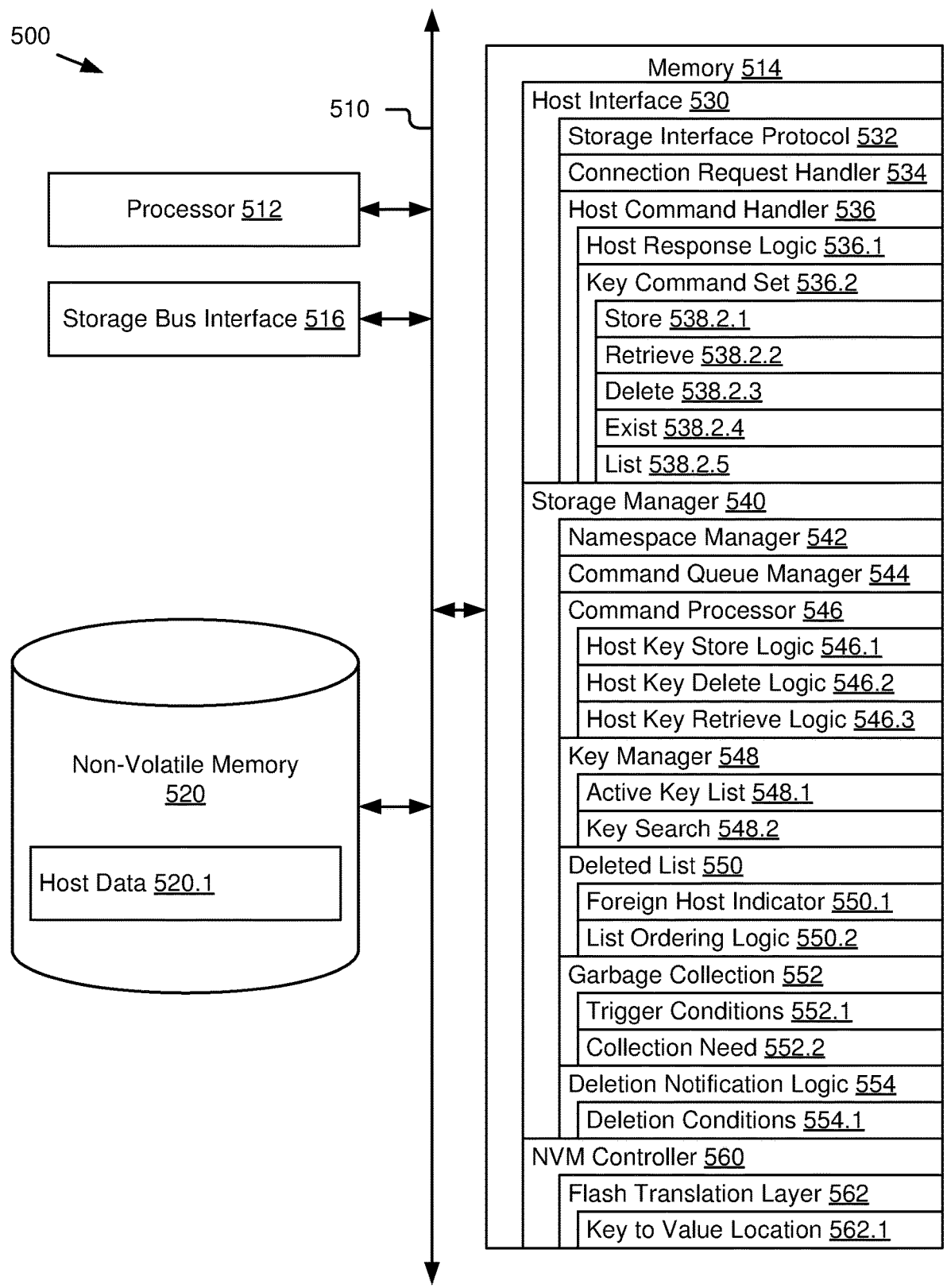
FIG. 5 schematically illustrates some elements of a data storage device of FIG. 1-3 in more detail.

FIG. 5 schematically shows selected modules of a data storage device 500 configured for managing delete commands from multiple hosts using a deleted data structure, such as deleted list 250 in FIG. 2. Storage device 500 may incorporate elements and configurations similar to those shown in FIGS. 1-3. For example, storage device 500 may be configured as storage device 120.1 in FIGS. 1 and 2 and/or a storage element 300 in FIG. 3.

Storage device 500 may include a bus 510 interconnecting at least one processor 512, at least one memory 514, and at least one interface, such as storage bus interface 516, also referred to as a host interface for storage device 500. Bus 510 may include one or more conductors that permit communication among the components of storage device 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element.

Storage bus interface 516 may include a physical interface for connecting to one or more hosts, such as through a storage interface controller, using an interface protocol that supports storage device access. For example, storage bus interface 516 may include a network (e.g., ethernet), PCIe, or similar storage interface connector supporting NVMe access to solid state media comprising non-volatile memory devices 520 from the hosts. In some configurations, storage bus interface 516 may be an ethernet interface configured for NVMeoF access to storage device 500.

Storage device 500 may include one or more non-volatile memory devices 520 or similar storage elements configured to store host data. For example, non-volatile memory devices 520 may include a plurality of flash memory packages organized as an addressable memory array. In some embodiments, non-volatile memory devices 520 may include NAND or NOR flash memory devices comprised of single level cells (SLC), multiple level cell (MLC), triple-level cells, quad-level cells, etc. In some configurations, non-volatile memory devices 520 may include storage controller memory devices supporting memory 514 and/or allocated for system use in one or more of the attached SSDs.

Storage device 500 may include a plurality of modules or subsystems that are stored and/or instantiated in memory 514 for execution by processor 512 as instructions or operations. For example, memory 514 may include a host interface 530 configured to receive, process, and respond to host connection and data requests from client or host systems. Memory 514 may include a storage manager 540 configured to manage read/write operations and garbage collection for non-volatile memory devices 520. Memory 514 may include an NVM controller that controls the memory devices of non-volatile memory 520 for read, write, and erase operations.

Host interface 530 may include an interface protocol and/or set of functions and parameters for receiving, parsing, responding to, and otherwise managing requests from host devices, nodes, or systems. For example, host interface 530 may include functions for receiving and processing host requests for establishing host connections with one or more namespaces for reading, writing, modifying, or otherwise manipulating key-value pairs and their respective client or host data in accordance with host communication and storage protocols. In some embodiments, host interface 530 may enable direct memory access and/or access over NVMe protocols, such as RDMA and transmission control protocol/internet protocol (TCP/IP) access, through storage bus interface 516 to host data units 520.1 stored in non-volatile memory devices 520. For example, host interface 530 may include host communication protocols compatible with ethernet and/or another host interface that supports use of NVMe and/or RDMA protocols for data access to host data 520.1.

In some embodiments, host interface 530 may include a plurality of hardware and/or software modules configured to use processor 512 and memory 514 to handle or manage defined operations of host interface 530. For example, host interface 530 may include a storage interface protocol 532 configured to comply with the physical, transport, and storage application protocols supported by the host for communication over storage bus interface 516. For example, host interface 530 may include a connection request handler 534 configured to receive and respond to host connection requests. For example, host interface 530 may include a host command handler 536 configured to receive host storage commands to a particular host connection. In some embodiments, host interface 530 may include additional modules (not shown) for command handling, buffer management, storage device management and reporting, and other host-side functions.

In some embodiments, storage interface protocol 532 may include network and/or PCIe and NVMe compliant communication, command, and syntax functions, procedures, and data structures. In some embodiments, storage interface protocol 532 may include an NVMeoF or similar protocol supporting RDMA, transmission control protocol/internet protocol (TCP/IP), and/or other connections for communication between host nodes and target host data in non-volatile memory 520, such as namespaces mapped to the particular host. Storage interface protocol 532 may include interface definitions for receiving host connection requests and storage commands from the fabric network, as well as for providing responses to those requests and commands. In some embodiments, storage interface protocol 532 may assure that host interface 530 is compliant with host request, command, and response syntax while the backend of host interface 530 may be configured to interface with storage manager 540 in storage device firmware for processing host storage commands.

Connection request handler 534 may include interfaces, functions, parameters, and/or data structures for receiving host connection requests in accordance with storage interface protocol 532, determining an available command queue, such as a queue-pair, allocating the host connection (and corresponding host connection identifier) to a storage device processing queue, and providing a response to the host, such as confirmation of the host storage connection or an error reporting that no processing queues are available. For example, connection request handler 534 may receive a storage connection request for a target namespace in a NVMe-OF storage device and provide an appropriate namespace storage connection and host response. In some embodiments, data describing each host connection request and/or resulting host connection may be stored in host connection log data. For example, connection request handler 534 may generate entries in a connection log table or similar data structure indexed by host connection identifiers and including corresponding namespace and other information.

In some embodiments, host command handler 536 may include interfaces, functions, parameters, and/or data structures to provide a function similar to connection request handler 534 for host storage commands directed to the host storage connections allocated through connection request handler 534. For example, once a host storage connection for a given namespace and host connection identifier is allocated to a storage device queue-pair, the host may send any number of storage commands targeting data stored in that namespace. In some configurations, multiple storage device queue pairs for different host systems may provide command access to the same namespace. Host command handler 536 may include a direct interface to storage device queue pairs for both command submission and a return path for completion. Host command handler 536 may also include host response logic 536.1. For example, host response logic 536.1 may support completion messages through completion queues and/or asynchronous responses or commands sent to a host.

In some configurations, host command handler 536 may support storage device 500 and/or target namespaces being configured as key-value devices/namespaces that support a key-value command set 536.2. For example, NVMe may define a key-value command set for storage devices operating with native support of key-value storage without using logical block addresses (LBAs) or object storage with metadata overhead. Key-value storage may be supported by NVM controller 560 and/or flash translation layer 562 to map unique key identifiers to physical storage locations in non-volatile memory 520 for storing host data units as variable length values. In some configurations, key-value command set 536.2 may include: a store command 538.2.1 for writing a new host data unit indexed with a corresponding key to non-volatile memory 520; a retrieve command 538.2.2 for reading a previously written host data unit by providing the corresponding key; a delete command 538.2.3 for deleting a previously written host data unit by providing the corresponding key; an exist command 538.2.4 for querying whether a target key-value pair is in the namespace by providing the corresponding key; and a list command 538.2.5 for listing all active keys for key-values in the namespace.

Storage manager 540 may include an interface protocol and/or set of functions, parameters, and data structures for reading, writing, and deleting data units in non-volatile memory devices 520. For example, storage manager 540 may receive host storage commands received by host interface 530 and process them using storage device resources, such as processor 512, non-volatile memory 520, and NVM controller 560. In some configurations, some or all functions of storage manager 540 may be embodied in storage device firmware operating as an intermediary between host interface 530 and non-volatile memory access through NVM controller 560. In some embodiments, storage manager 540 may include a plurality of hardware and/or software modules configured to use processor 512 and memory 514 to handle or manage defined operations of storage manager 540. For example, storage manager 540 may include a namespace manager 542, command queue manager 544, command processor 546, key manager 548, deleted list 550, garbage collection 552, and deletion notification logic 554.

Namespace manager 542 may include interfaces, functions, parameters, and/or data structures configured to manage the namespaces allocated in non-volatile memory 520. For example, non-volatile memory 520 may be allocated to one or more namespaces and, in some configurations, a number of endurance groups and/or NVM sets. Non-volatile memory 520 may also include unallocated capacity, reserved capacity, and/or administrative capacity allocated to storing internal data for storage device 120, such as configuration pages, logs, operating metrics, FTL indices, etc. Namespace manager 542 may receive administrative commands to configure one or more namespaces for use by host systems. In some cases, non-volatile memory 520 may be configured as a single namespace.

Command queue manager 544 may include interfaces, functions, parameters, and/or data structures configured to manage allocation and maintenance of storage queue-pairs. For example, command queue manager 544 may allocate and maintain pairs of circular buffers for receiving host storage commands through host interface 530. Queue pairs may include a command submission queue and a command completion queue. In some configurations, command queue manager 544 may maintain sets of head and tail doorbells for each command queue to determine where new host storage commands enter the queue and where commands are selected from for processing by command processor 546. Command queue manager 544 may determine a first memory space allocated to each host queue pair, including a host submission queue and a host completion queue, and a second memory space allocated to each backend queue pair, include a backend submission queue and a backend completion queue. For example, command queue manager 544 may control access to a set of circular registers accessible through direct memory access to allocate the queue pairs.

Command processor 546 may include interfaces, functions, parameters, and/or data structures configured to process commands from the command queues using non-volatile memory 520.1 and other resources. For example, command processor may select a next host storage command from a command submission queue, determine the target key identifier, and execute the command through NVM controller 560. In some configurations, command processor 546 may include logic for storing host identifiers with the host data unit and using delete list 550 during command processing. For example, host key store logic 546.1 may determine the key and host data unit for a key-value pair, determine the corresponding host identifier, and append the host identifier to the host data unit to generate the value to be stored by NVM controller 560. The host identifier may be determined based on the host identifier associated with the host connection and/or included within the parameters of the store command.

As another example, host key delete logic 546.2 may determine the key for the target host-value pair to be deleted, determine (through key manager 548) that the key-value pair is active, and move the key to deleted list 550. Moving the key may include removing the key from active key list 548.1 and adding a corresponding entry with the key to deleted list 550. In some configurations, key-to-value physical location mapping values and/or a pointer to those values may also be moved with the key. In some configurations, host key delete logic 546.2 may also include logic for determining a foreign host indicator value to be included in the key entry in deleted list 550. The foreign host indicator value may be generated by determining the host identifier for the delete command (from command parameters or host connection), parsing the host identifier from the value, and comparing them to determine whether the delete command is from the original host or a different host to assign a corresponding foreign host indicator value. The foreign host indicator value may be stored in a corresponding entry for the key in deleted list 550.

As another example, host key retrieve logic 546.3 may determine the key for the target host-value pair to be retrieved, determine (through key manager 548) whether the key-value pair is active, and use NVM controller 560 to read the corresponding value for the key from non-volatile memory 520 for return to the requesting host. If host key retrieve logic 546.3 determines that the target key is not in active key list 548.1, it may check deleted list 550 to determine whether the key-value has been deleted but is still recoverable (the corresponding erase blocks have not yet been invalidated through garbage collection). Key-value retrieve logic 546.3 may initiate a search of deleted list 550 for the target key and, if found, use the deleted list entry for the key to determine the physical storage locations for the value and read it from non-volatile memory 520 to return to the requesting host. Additionally, key-value retrieve logic 546.3 may return or restore the key-value pair to the active list. For example, key-value retrieve logic 546.3 may add the key value back to active key list 548.1 and delete the entry for that key from deleted list 550.

Key manager 548 may include interfaces, functions, parameters, and/or data structures configured to manage unique keys for accessing values written to host data 520.1 for the host key-value pairs stored to storage device 500. For example, key manager 548 may include an active key list 548.1 or similar active key-value pair data structure that includes key entries for each key identifier with a corresponding value stored in non-volatile memory 520. Key manager 548 may interface with or be included in NVM controller 560 to map key values to physical storage locations for the corresponding values in flash translation layer 562. In some configurations, active key list 548.1 may be a separate data structure from flash translation layer mapping and include pointers to the corresponding FTL mapping. Key manager 548 may be configured for key search 548.2 to determine whether or not a target key exists in the active key list 548.1. For example, key search 548.2 may be used for each command subsequent to a store command to determine whether the target key exists for retrieve, delete, or exist commands. In some configurations, key search 248.2 may operate in conjunction with flash translation layer 562 to determine the physical storage locations and/or retrieve the value based on the key search.

Deleted list 550 may include interfaces, functions, parameters, and/or data structures configured to hold and organize keys for key-values that have been logically deleted from the perspective of at least one host but may be recoverable until the corresponding erase blocks are invalidated through garbage collection. For example, deleted list 550 may be a data structure constructed of data entries corresponding to each deleted key-value pair that has not yet been invalidated through garbage collection. In some configurations, deleted list 550 may include entries for foreign host indicator 550.1 for each deleted key. For example, a flag value determined by host key delete logic 546.2 for foreign host indicator 550.1 may be associated with each key identifier entry.

In some configurations, deleted list 550 may include list ordering logic 550.2 to support selection of deleted key-value pairs for processing by garbage collection 552. For example, deleted list 550 may use first-in-first-out queuing logic to add key identifier entries to deleted list 550 and determine the next key-value pair for garbage collection 552. This logic means that the oldest deletions are processed first and may provide a buffer period during which a more recently deleted key-value pair may be recovered (as older deletions are processed ahead of the more recent ones). In some configurations, list ordering logic 550.2 may support more complex ordering and selection configurations that may increase the buffer period for some deleted key-value pairs and/or more efficiently collect erase blocks matched to the needs of garbage collection 552. Priority for selecting key-value pairs from deleted list 550 may be based on fetching one or more key-value pairs that have a memory size corresponding to the number of erase blocks needed for garbage collection at a particular point of time. For example, garbage collection may be triggered to recover a threshold number of erase blocks and key-value pairs may be sorted by their memory size to select one or more key-value pairs for garbage collection that meet the threshold number. This may enable one larger key-value pair to be deleted while preserving more (smaller) key-value pairs to extend the average buffer period and/or limit the invalidation of more erase blocks than are needed (such as from selecting a next key-value pair with a size that greatly exceeds the number of erase blocks needed). Priority for selecting key-value pairs from deleted list 550 may be based on fetching erase blocks having higher bit error rates, lower usage, or other metrics to meet other memory allocation priorities for storage device 500 to promote data reliability and endurance. In some configurations, other factors, in addition to deletion order, memory size, and/or operating metrics, may be used to determine priority. For example, foreign host indicator 550.1 may be used to prioritize garbage collection of key-value pairs deleted by their original host ahead of those deleted by foreign hosts, as foreign host deletions may be more error prone and more likely to be candidates for recovery, particularly by the original host. Storage manager 540 may include various functions that generate operational parameters, such as workload data, error rates, configuration parameters, physical parameters, storage parameters (e.g., aggregate storage space used/available/deleted for garbage collection, wear leveling statistics, etc.), error logs, event logs, and other operational parameters that may be aggregated and reported through various interfaces, functions, or services that may be used by list ordering logic 550.2.

Garbage collection 552 may include interfaces, functions, parameters, and/or data structures configured to select erase blocks (also referred to as memory blocks or programming blocks) to be collected based on key-value pairs in deleted list 550. For example, garbage collection 552 may be a background operation of storage device 500 that determines memory blocks that are no longer storing active host data to invalidate those memory blocks for reuse by new store operations. Garbage collection 552 may be based on a set of trigger conditions 552.1. For example, when a used capacity, deleted capacity, and/or available capacity reaches a garbage collection threshold, garbage collection operations may be triggered. In some configurations, the garbage collection threshold may be dynamically determined based on the usage pattern of the storage device, such as lowering the garbage collection threshold for fast-filling storage devices or during idle or lower-volume processing times. Garbage collection 552 may also determine a target collection need 552.2 in terms of the number of erase blocks needed when it is triggered. For example, a target number of erase blocks may be determined that brings the available capacity back over the garbage collection threshold by a defined margin.

Deleted notification logic 554 may include interfaces, functions, parameters, and/or data structures configured to send notifications to one or more host and/or administrative systems related to deletion commands, deletion conditions, and/or garbage collection. For example, deleted notification logic 554 may include additional notifications to one or more hosts in addition to a completion response to the host delete command. In some configurations, deleted notification logic 554 may provide additional information through an asynchronous response to one or more hosts associated with the namespace through host interface 530. For example, all hosts may be notified of the delete command (in addition to the host that submitted the delete command) and corresponding deletion condition. The asynchronous response may include the key identifier and a corresponding foreign host indicator from deleted list 550. This may notify other hosts of the delete and allow them to take advantage of deleted list 550 to recover the deleted key-value pair using a retrieve command. In some configurations, deletion conditions may indicate presence on deleted list 550 as a first deleted state and/or may indicate invalidation through garbage collection as a second deleted state.

NVM controller 560 may include an interface protocol and/or set of functions, parameters, and/or data structures for reading, writing, and deleting data units from the non-volatile memory devices that make up non-volatile memory 520, generally based on physical programming blocks or erase blocks on those devices. For example, storage manager 540 may include functions for executing host data operations at the programming block level related to host storage commands through an NVM interface and corresponding bus to an array of NVM packages. For example, write commands may be configured to write each value to non-volatile memory devices 520 as one or more programming blocks corresponding the memory size of the value. Read commands may be configured to read data from those programmed memory blocks to reassemble the values in response to retrieve commands. Delete commands may be configured to logically delete data, such as by marking the key for deletion until a future garbage collection or similar operation actually erases the data or reallocates the physical storage location to another purpose. In some embodiments, storage manager 540 may include flash translation layer (FTL) 562, data state machine, read/write buffer management, NVM device interface protocols, NVM device configuration/management/maintenance, and other device-side functions. For key-value data storage, FTL 562 may manage physical storage locations in relation to key identifiers rather than logical block addresses. For example, FTL 562 may include a key to value storage location mapping that uses the key identifier as an index value to locate one or more pages and/or data segments in those pages corresponding to the host-defined memory size of that value. In some configurations, key to value location mapping 562.1 may include an FTL table or similar data structure persisted in non-volatile memory 520. In some configurations, active key list 548.1 may use the FTL table and/or point to entries in the FTL table to manage active key list 548.1. In some configurations, deleted list 550 may include pointers to the FTL table and/or may copy key to value location entries from key to value location mapping 562.1 to preserve that information for recovery as described above.

Figure 6A:
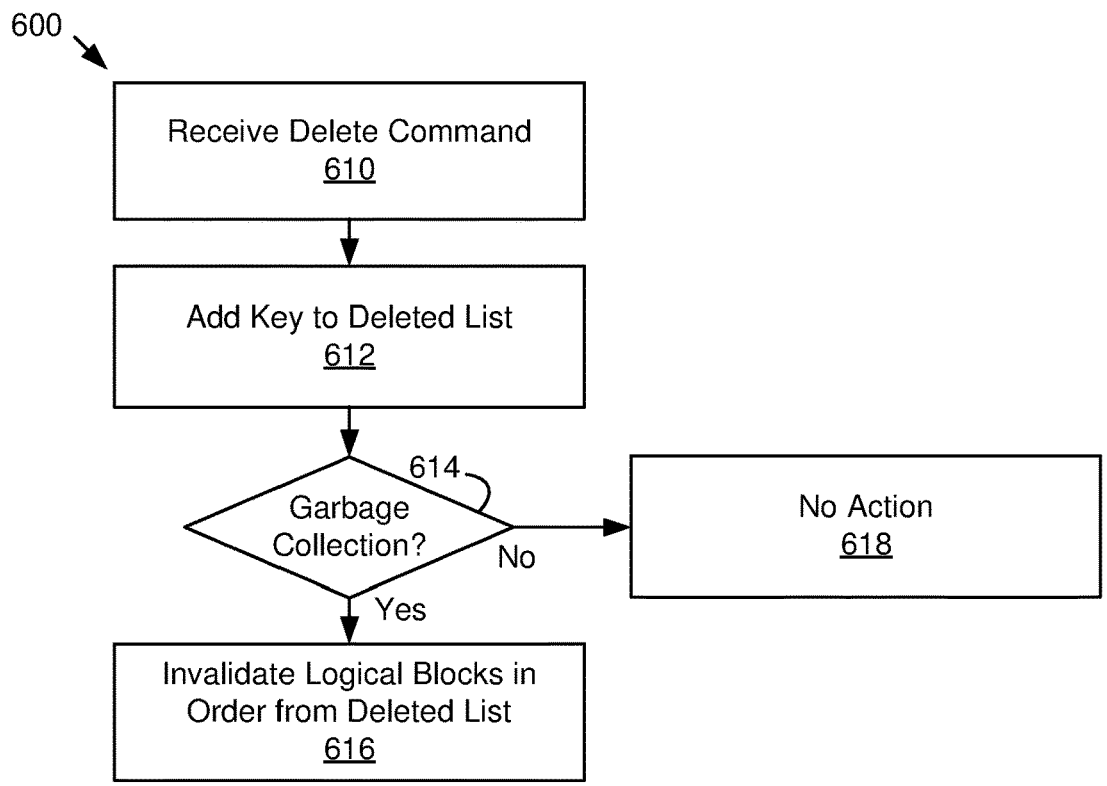
FIG. 6a is a flowchart of an example method of using a deleted data structure to manage host deletion of key-values.

As shown in FIG. 6a, storage device 500 may be operated according to an example method for using a deleted data structure to manage host deletion of key-values, i.e., according to method 600 illustrated by blocks 610-618 in FIG. 6a.

At block 610, a delete command may be received. For example, the storage device may receive a delete command targeting a key-value pair through a host interface.

At block 612, the key may be added to a deleted list. For example, the storage device may maintain a deleted list in firmware and add the key corresponding to the key-value pair to the deleted list.

At block 614, whether garbage collection has been initiated may be determined. For example, the storage device may initiate garbage collection based on one or more trigger conditions and, for any given operating period, the storage device may check whether garbage collection is operating or not. If garbage collection is initiated, method 600 may proceed to block 616. If garbage collection is not initiated, method 600 may proceed to block 618 and take no action until garbage collection is initiated.

At block 616, logical blocks may be invalidated in a delete order from the deleted list. For example, the garbage collection may use list ordering logic based on the order in which the keys were added to the deleted list to determine the next key-value pair to use for invalidating erase blocks to recover storage capacity.

Figure 6B:
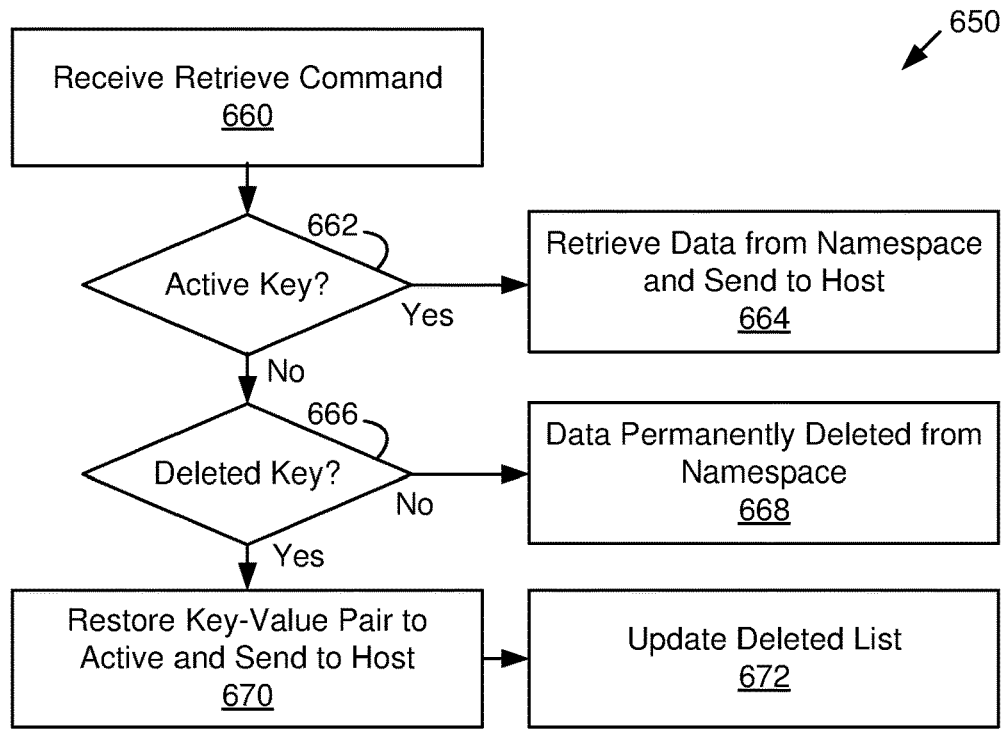
FIG. 6b is a flowchart of an example method of using a deleted data structure to restore previously deleted key-values.

As shown in FIG. 6b, storage device 500 may be operated according to an example method for using a deleted data structure to restore previously deleted key-values that operates in parallel with method 600 of FIG. 6a, i.e., according to method 650 illustrated by blocks 660-672 in FIG. 6b.

At block 660, a retrieve command may be received for a target key-value pair. For example, the storage device may receive a retrieve command that includes a key identifier for a previously stored key-value pair.

At block 662, whether an active key exists for the key identifier may be determined. For example, the storage device may search an active key list to determine whether the key-value pair is active or has previously been targeted by a delete command. If the key identifier corresponds to an active key, method 650 may proceed to block 664 to retrieve the data for the value from the namespace and send the host date unit to the requesting host. If the key identifier does not correspond to an active key, method 650 may proceed to block 666.

At block 666, whether the key identifier is on the deleted list may be determined. For example, the storage device may search the deleted list for the key identifier. If the key identifier is not on the deleted list, method 650 may proceed to block 668, the value data has been permanently deleted from the namespace (barring redundancy), and a notification of the key not being found may be returned to the host. If the key identifier is on the deleted list, method 650 may proceed to block 670.

At block 670, the key-value pair may be restored to active and sent to the host. For example, the storage device may return the key to the active list and use the corresponding mapping information to return the host data unit stored in the value to the requesting host.

At block 672, the deleted list may be updated. For example, the key identifier that has been moved to the active list may be removed from the deleted list to assure that it is not targeted for garbage collection.

Figure 7:
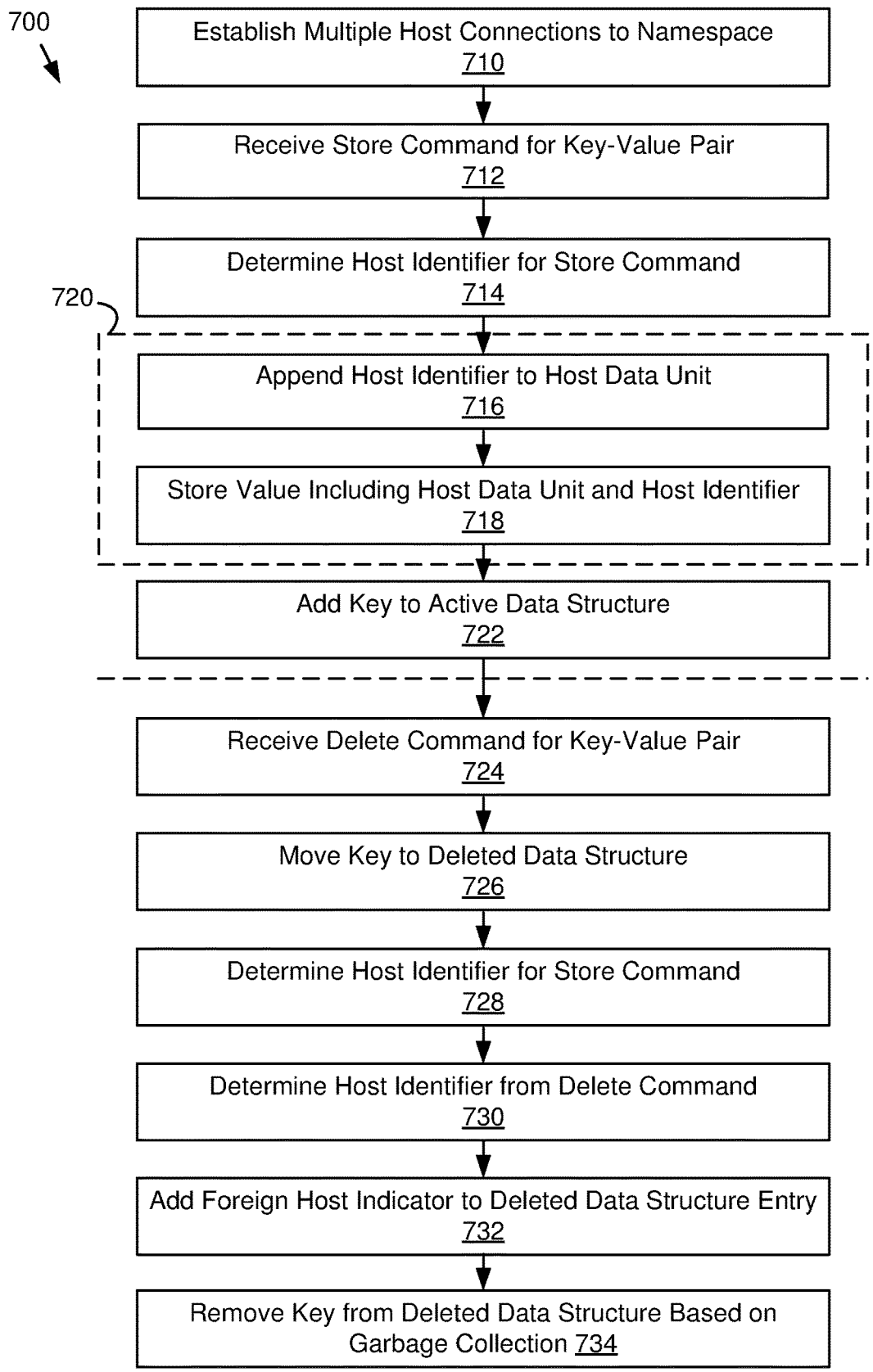
FIG. 7 is a flowchart of an example method of storing and deleting key-value pairs using a deleted data structure.

As shown in FIG. 7, storage device 500 may be operated according to an example method for storing and deleting key-value pairs using a deleted data structure, i.e., according to method 700 illustrated by blocks 710-734 in FIG. 7.

At block 710, multiple host connections may be established to a namespace. For example, the storage device may host at least one namespace and accept connections to more than one host for that namespace.

At block 712, a store command may be received for a key-value pair. For example, the storage device may receive a store command defining a key identifier and corresponding host data unit for storage.

At block 714, a host identifier may be determined for the store command. For example, the storage device may determine the host identifier for the host that sent the store command based on the parameters of the store command or the host connection through which the command was received.

At block 716, the host identifier may be appended to the host data unit. For example, a host identifier value may be added to the end of the host data unit.

At block 718, the value including the host data unit and the host identifier may be stored. For example, the storage device may write the resulting value to one or more programming blocks of the non-volatile memory. Blocks 716 and 718 may be an example sub-method 720 of associating a host identifier with the host data unit for the key-value pair.

At block 722, the key may be added to an active key data structure. For example, the data storage device may add the key to the FTL mapping index to associate it with the physical storage locations that store the value.

At block 724, a delete command may be received for the key-value pair. For example, the storage device may receive a delete command targeting the key identifier corresponding to the previously saved key-value pair.

At block 726, the key may be moved to a deleted data structure. For example, the storage device may include a deleted list including key entries for key-value pairs that have been deleted but not yet garbage collected and add an entry for the key identifier of the target key-value pair.

At block 728, a host identifier may be determined for the store command. For example, the storage device may determine the host identifier for the host that sent the store command from the host identifier appended to the value stored in the non-volatile memory.

At block 730, a host identifier may be determined for the delete command. For example, the storage device may determine the host identifier for the host that sent the delete command based on the parameters of the delete command or the host connection through which the command was received.

At block 732, a foreign host indicator may be added to the deleted data structure entry for the key identifier. For example, the storage device may compare the host identifiers for the storing host and the deleting host to determine whether they are the same and select a corresponding foreign host indicator value to associate with the entry in the deleted list.

At block 734, the key may be removed from the deleted data structure based on garbage collection. For example, responsive to garbage collection of at least one erase block storing a portion of the value, the key identifier and corresponding entry may be removed from the deleted list.

Figure 8:
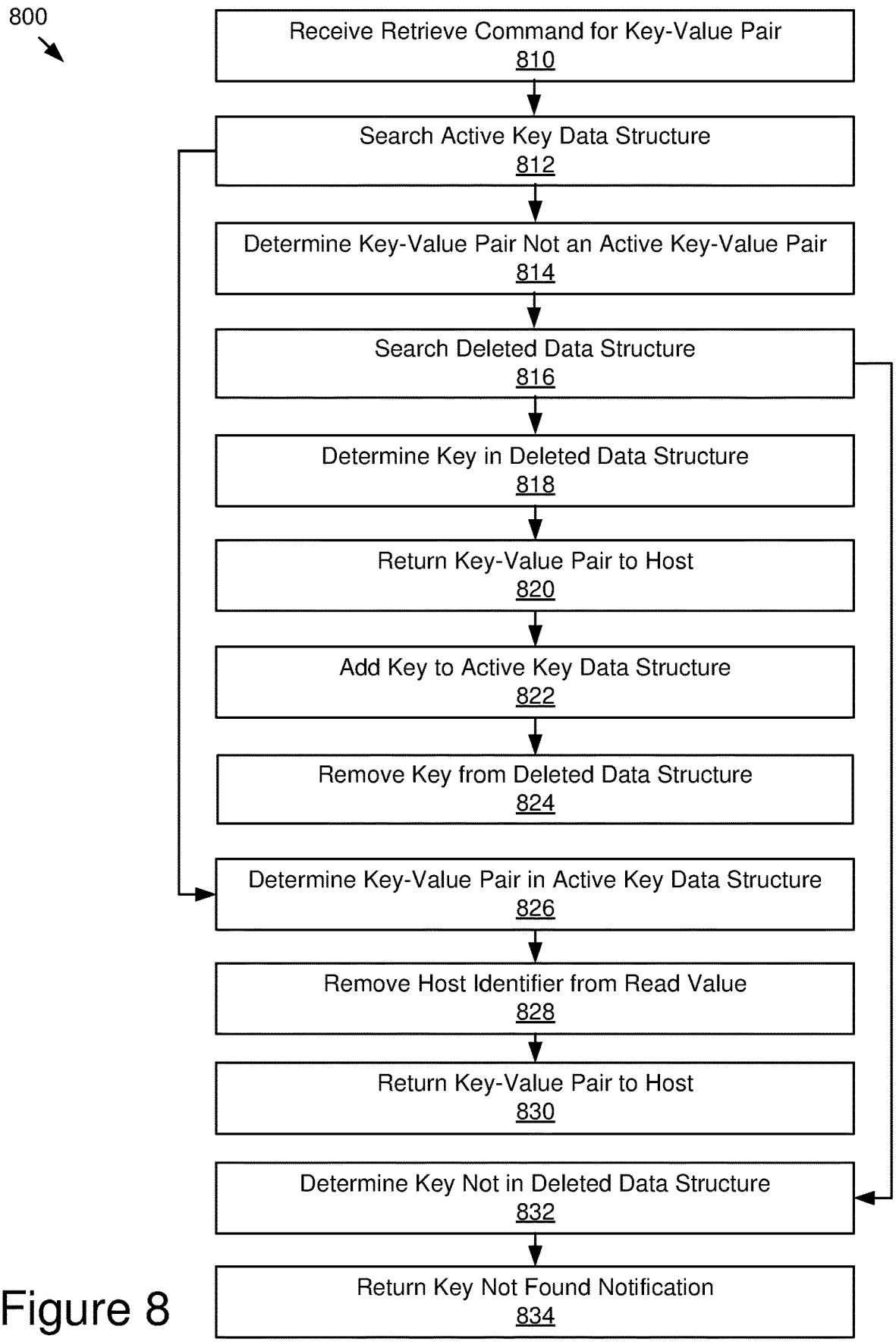
FIG. 8 is a flowchart of an example method of processing retrieve commands for key-value pairs using the deleted data structure.

As shown in FIG. 8, storage device 500 may be operated according to an example method for processing retrieve commands for key-value pairs using the deleted data structure, i.e., according to method 800 illustrated by blocks 810-834 in FIG. 8.

At block 810, a retrieve command for a target key-value pair may be received. For example, the storage device may receive a retrieve command including the key identifier from one of the hosts.

At block 812, an active key data structure may be searched. For example, the storage device may search the active key list to determine whether the targeted key-value pair is currently active and has not been deleted.

At block 814, the key-value pair may be determined to not be an active key-value pair. For example, the key identifier may not appear in the active key list and not be returned by the search at block 812.

At block 816, the deleted data structure may be searched. For example, the storage device may search the deleted list to determine whether the targeted key-value pair has been deleted but not yet garbage collected.

At block 818, the key may be determined to be in the deleted data structure. For example, the search at block 816 may return the key identifier corresponding to the key-value pair.

At block 820, the key-value pair may be returned to the host. For example, the entry for the key identifier in the deleted list may enable the storage device to determine the physical storage locations of the value to complete a read command for those programmed blocks and return the host data unit to the host (after removing the host identifier).

At block 822, the key may be added to the active key data structure. For example, the storage device may restore the entry for the key identifier in the FTL mapping and/or active key list.

At block 824, the key may be removed from the deleted data structure. For example, the storage device may remove the entry corresponding to the key identifier from the deleted list, effectively moving the key-value pair from the deleted list back to the active key list.

At block 826, the key-value pair may be determined to be in the active key data structure. For example, the search at block 812 may return the key identifier for the key-value pair and the value may be read from the corresponding programmed blocks in the non-volatile memory.

At block 828, the host identifier may be removed from the value read from the non-volatile memory. For example, the storage device may read and buffer the host data from the storage locations for the value but not include and/or remove the host identifier appended to the host data unit for storing the value.

At block 830, the key-value pair may be returned to the host. For example, the storage device may return the host data unit and key identifier in response to the retrieve command.

At block 832, the key may be determined to not be in the deleted data structure. For example, the key-value pair may have already been targeted by garbage collection and removed from the deleted list, so no entry may be returned from the search at block 816.

At block 834, a key not found notification may be returned to the host. For example, the storage device may respond to the retrieve command with a notification message or completion response indicating that the key identifier is not found in the namespace.

Figure 9:
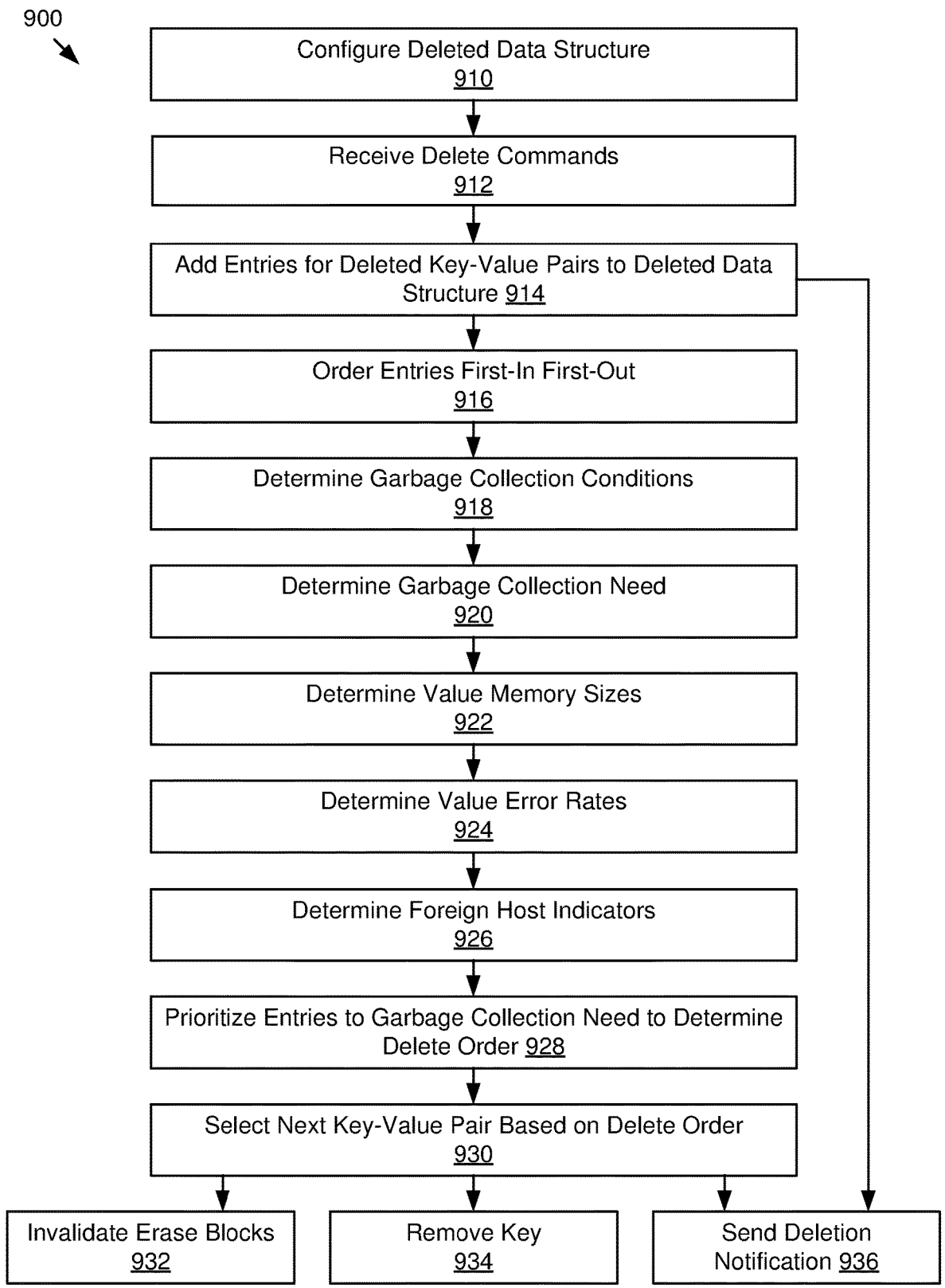
FIG. 9 is a flowchart of an example method of processing garbage collection for key-value pairs using the deleted data structure.

As shown in FIG. 9, storage device 500 may be operated according to an example method for processing garbage collection for key-value pairs using the deleted data structure, i.e., according to method 900 illustrated by blocks 910-936 in FIG. 9.

At block 910, a deleted data structure may be configured. For example, the storage device may include a deleted list in memory for managing key-value pairs that have been logically deleted by at least one host but have not yet been garbage collected by the storage device.

At block 912, delete commands may be received. For example, the storage device may receive delete commands from the hosts targeting various previously stored key-value pairs.

At block 914, entries may be added to the deleted data structure for deleted key value pairs. For example, each time a delete command is processed for a key-value pair on the active key list, a new entry may be generated for that key identifier and added to the deleted list to represent its deleted condition.

At block 916, entries may be ordered in a first-in-first-out order. For example, the storage device may add the entries to the deleted list with an entry order such that they are ordered according to the relative times when the delete commands were received and/or processed.

At block 918, garbage collection conditions may be determined. For example, the storage device may determine that a garbage collection threshold has been met based on the remaining unused capacity for the namespace.

At block 920, a garbage collection need may be determined. For example, the storage device may calculate, based on the garbage collection threshold, the remaining unused capacity, and a fill rate or other operating parameters, a target number of memory blocks or erase blocks to be recovered as available capacity for future store commands or other operations.

At block 922, memory sizes may be determined for the values of the key-value pairs. For example, the number of programmed blocks corresponding to each value for the key-value pairs in the deleted data structure may be determined from the key to physical mapping or a previously stored size parameter for that key-value pair in the deleted list.

At block 924, error rates may be determined for the values of the key-value pairs. For example, the error rates of the programmed blocks corresponding to the stored values may be determined from error logs and the key to physical mapping for each key-value pair in the deleted list.

At block 926, foreign host indicators may be determined for the key-value pairs. For example, foreign host indicators may be read from the entries in the deleted list for each key-value pair in the deleted list.

At block 928, deleted data structure entries may be prioritized based on garbage collection need to determine the delete order. For example, the storage device may use one or more of the values determined at blocks 922, 924, and 926 and the garbage collection need determined at block 920 to reorder the deleted list and/or fetch specific entries from the deleted list based on the first in order to prioritize garbage collection that preserves key-value entries in the deleted list to allow a recovery time buffer.

At block 930, a next key-value pair may be selected based on the delete order. For example, based on the delete order determined at block 928, the storage device may select a next key-value pair and provide the corresponding set of erase blocks for garbage collection.

At block 932, the erase blocks corresponding to the key-value pair may be invalidated. For example, the storage device may erase and/or otherwise provide those erase blocks as available capacity for storage operations and invalidate the key-value pair.

At block 934, the key may be removed from the namespace. For example, the storage device may delete the key identifier entry for the invalidated key-value pair from the deleted list and confirm that the key identifier no longer appears in the active key list and/or FTL mapping data structure, indicating an unrecoverable deleted condition.

At block 936, a deletion notifications may be sent to the hosts. The storage device may send deletion notifications to all hosts connected to the namespace in response to a delete command moving the key-value pair to the deleted data structure and/or garbage collection removing the key-value pair from the namespace entirely.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A data storage device, comprising:
a non-volatile storage medium;
a host interface configured to receive host storage commands from a plurality of host systems; and
a controller configured to:
store, to the non-volatile storage medium, host data units as values indexed by a corresponding key in key-value pairs;
receive, from a first host system of the plurality of host systems, a delete command for a target key-value pair, wherein the target key-value pair comprises a first host identifier for a storing host system that previously stored the target key-value pair;
move, responsive to the delete command, the corresponding key for the target key-value pair to a deleted data structure having a delete order;
add, responsive to the first host system being different than the storing host system, a foreign host indicator to an entry in the deleted data structure for the target key-value pair;
invalidate, during garbage collection, erase blocks corresponding to key-value pairs from the deleted data structure based on the delete order; and
remove, responsive to garbage collection, corresponding keys for the invalidated key-value pairs from the deleted data structure.

2. The data storage device of claim 1, wherein the controller is further configured to:
receive, from a second host system of the plurality of host systems, a retrieve command for the target key-value pair after the delete command;
determine, responsive to the retrieve command, that the target key-value pair is not an active key-value pair;
determine, responsive to determining that the target key-value pair is not an active key-value pair, whether the corresponding key for the target key-value pair is in the deleted data structure; and
return, responsive to the corresponding key for the target key-value pair being in the deleted data structure, the key-value pair to the second host system.

3. The data storage device of claim 2, wherein the controller is further configured to:
add, responsive to the retrieve command for the target key-value pair determined to be in the deleted data structure, the corresponding key for the target key-value pair to an active key-value pair data structure; and
remove, responsive to the retrieve command for the target key-value pair determined to be in the deleted data structure, the corresponding key for the target key-value pair from the deleted data structure.

4. The data storage device of claim 2, wherein the controller is further configured to, responsive to the corresponding key for the target key-value pair not being in the deleted data structure, return a key-not-found notification to the second host system.

5. The data storage device of claim 1, wherein the controller is further configured to:
receive, prior to receiving the delete command, a store command for the target key-value pair including the corresponding key and host data unit for the target key-value pair;
determine the first host identifier for the storing host system; and
associate the first host identifier with the host data unit for the target key-value pair.

6. The data storage device of claim 5, wherein associating the first host identifier with the host data unit for the target key-value pair comprises:
appending the first host identifier to the host data unit to determine the value for the target key-value pair; and
storing the value for the target key-value pair to the non-volatile storage medium.

7. The data storage device of claim 6, wherein the controller is further configured to, responsive to receiving the delete command:
determine the first host identifier from the stored value for the target key-value pair;
determine a second host identifier for the first host system; and
compare the first host identifier to the second host identifier to determine the foreign host indicator to add to the entry in the deleted data structure for the target key-value pair.

8. The data storage device of claim 7, wherein the foreign host indicator is selected from:
a first indicator value corresponding to the first host identifier matching the second host identifier; and
a second indicator value corresponding to the first host identifier being different than the second host identifier.

9. The data storage device of claim 1, wherein:
the controller is further configured to:
determine the delete order for the deleted data structure; and
select, during garbage collection, a next key-value pair from the deleted data structure to invalidate corresponding erase blocks; and
the delete order is based on at least one priority parameter selected from:
entry order into the deleted data structure;
a memory size of the value for the next key-value pair;
an error rate of an erase block corresponding to the value for the next key-value pair; and
a foreign host indicator.

10. The data storage device of claim 1, wherein the controller is further configured to:
  determine a deletion condition for the target key-value pair; and
  send, based on the deletion condition, a notification message to at least one host system of the plurality of host systems.

11. A computer-implemented method, comprising:
  storing, to a non-volatile storage medium of a data storage device, host data units as values indexed by a corresponding key in key-value pairs;
  receiving, by the data storage device and from a first host system of a plurality of host systems, a delete command for a target key-value pair;
  moving, by the data storage device and responsive to the delete command, the corresponding key for the target key-value pair to a deleted data structure, wherein the deleted data structure comprises a series of key value entries configured in a delete order;
  determining, by the data storage device, a storing host system that previously stored the target key-value pair;
  adding, responsive to the first host system being different than the storing host system, a foreign host indicator to the key value entry in the deleted data structure for the target key-value pair;
  invalidating, by the data storage device and during garbage collection, erase blocks corresponding to key-value pairs from the deleted data structure based on the delete order; and
  removing, by the data storage device and responsive to garbage collection, corresponding keys for invalidated key-value pairs from the deleted data structure.

12. The computer-implemented method of claim 11, further comprising:
  receiving, from a second host system of the plurality of host systems, a retrieve command for the target key-value pair after the delete command;
  determining, responsive to the retrieve command, that the target key-value pair is not an active key-value pair;
  determining, responsive to determining that the target key-value pair is not an active key-value pair, whether the corresponding key for the target key-value pair is in the deleted data structure; and
  returning, responsive to the corresponding key for the target key-value pair being in the deleted data structure, the key-value pair to the second host system.

13. The computer-implemented method of claim 12, further comprising:
  adding, responsive to the retrieve command for the target key-value pair determined to be in the deleted data structure, the corresponding key for the target key-value pair to an active key-value pair data structure; and
  removing, responsive to the retrieve command for the target key-value pair determined to be in the deleted data structure, the corresponding key for the target key-value pair from the deleted data structure.

14. The computer-implemented method of claim 12, further comprising:
  returning, responsive to the corresponding key for the target key-value pair not being in the deleted data structure, a key-not-found notification to the second host system.

15. The computer-implemented method of claim 11, further comprising:
  receiving, prior to receiving the delete command, a store command for the target key-value pair including the corresponding key and host data unit for the target key-value pair;
  determining a first host identifier for a storing host system; and
  associating the first host identifier with the host data unit for the target key-value pair.

16. The computer-implemented method of claim 15, wherein associating the first host identifier with the host data unit for the target key-value pair comprises:
  appending the first host identifier to the host data unit to determine the value for the target key-value pair; and
  storing the value for the target key-value pair to the non-volatile storage medium.

17. The computer-implemented method of claim 16, further comprising, responsive to receiving the delete command:
  determining the first host identifier from the stored value for the target key-value pair;
  determining a second host identifier for the first host system; and
  comparing the first host identifier to the second host identifier to determine the, a foreign host indicator to add to the entry in the deleted data structure for the target key-value pair, wherein the foreign host indicator is selected from:
    a first indicator value corresponding to the first host identifier matching the second host identifier; and
    a second indicator value corresponding to the first host identifier being different than the second host identifier.

18. The computer-implemented method of claim 11, further comprising:
  determining the delete order for the deleted data structure; and
  selecting, during garbage collection, a next key-value pair from the deleted data structure to invalidate corresponding erase blocks, wherein the delete order is based on at least one priority parameter selected from:
    entry order into the deleted data structure;
    a memory size of the value for the next key-value pair;
    an error rate of an erase block corresponding to the value for the next key-value pair; and
    a foreign host indicator.

19. The computer-implemented method of claim 11, further comprising:
  determining a deletion condition for the target key-value pair; and
  sending, based on the deletion condition, a notification message to at least one host system of the plurality of host systems.

20. A data storage device comprising:
  at least one processor;
  at least one memory;
  a non-volatile storage medium;
  a host interface configured to receive host storage commands from a plurality of host systems;
  means for storing, to the non-volatile storage medium, host data units as values indexed by a corresponding key in key-value pairs;
  means for receiving, from a first host system of the plurality of host systems, a delete command for a target key-value pair;
  means for moving, responsive to the delete command, the corresponding key for the target key-value pair to a deleted data structure having a delete order;

means for determining a storing host system that previously stored the target key-value pair;

means for adding, responsive to the first host system being different than the storing host system, a foreign host indicator to a key value entry in the deleted data structure for the target key-value pair;

means for invalidating, during garbage collection, erase blocks corresponding to key-value pairs from the deleted data structure based on the delete order; and means for removing, responsive to garbage collection, corresponding keys for the invalidated key-value pairs from the deleted data structure.

* * * * *